United States Patent
Whang

(10) Patent No.: US 9,678,626 B2
(45) Date of Patent: Jun. 13, 2017

(54) HANDHELD DEVICES AS VISUAL INDICATORS

(71) Applicant: APPLE INC., Cupertino, CA (US)

(72) Inventor: Eugene Antony Whang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 13/718,969

(22) Filed: Dec. 18, 2012

(65) Prior Publication Data

US 2013/0104043 A1    Apr. 25, 2013

Related U.S. Application Data

(63) Continuation of application No. 12/128,586, filed on May 28, 2008, now abandoned, which is a continuation of application No. 10/889,933, filed on Jul. 12, 2004, now Pat. No. 7,616,097.

(51) Int. Cl.
*G06F 3/00* (2006.01)
*G06F 3/0482* (2013.01)
*G09G 3/34* (2006.01)

(52) U.S. Cl.
CPC ......... *G06F 3/0482* (2013.01); *G09G 3/3406* (2013.01); *G09G 2320/064* (2013.01); *G09G 2320/0633* (2013.01)

(58) Field of Classification Search
CPC ........... G09G 3/3406; G09G 2320/064; G09G 2320/0633; G06F 3/0482
USPC .................. 345/156–158, 168–169, 173, 87; 715/864–866; 455/566
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,674,743 A | 6/1987 | Hirano |
| 4,692,915 A | 9/1987 | Moriya et al. |
| 4,776,323 A | 10/1988 | Spector |
| 4,849,963 A | 7/1989 | Kawano et al. |
| 4,939,611 A | 7/1990 | Connolly |
| 5,001,462 A | 3/1991 | Seemann et al. |
| 5,137,501 A | 8/1992 | Mertesdorf |

(Continued)

FOREIGN PATENT DOCUMENTS

| | | |
|---|---|---|
| JP | 10-188452 | 7/1998 |
| JP | 2001211237 | 8/2001 |

(Continued)

OTHER PUBLICATIONS

Toshiba MK2003GAH (HDD1364) Hard Disk Drive Specifications, Toshiba America Inc., 2003, pp. 1-3.

(Continued)

*Primary Examiner* — Jason Mandeville
(74) *Attorney, Agent, or Firm* — Fletcher Yoder, P.C.

(57) ABSTRACT

A computing device is configured with a multifunctional backlit display. The backlighting can be operated in at least a first mode and a second mode. In a first mode, the backlighting provides luminance to the display so that images on the display can be easily seen. In a second mode, the backlighting provides visual stimulus for relaying information to a user or a user's surroundings.

20 Claims, 8 Drawing Sheets

(56) References Cited

U.S. PATENT DOCUMENTS

| | | |
|---|---|---|
| 5,267,942 A | 12/1993 | Saperston |
| 5,313,187 A | 5/1994 | Choi et al. |
| 5,313,188 A | 5/1994 | Choi et al. |
| 5,343,871 A | 9/1994 | Bittman et al. |
| 5,406,305 A | 4/1995 | Shimomura et al. |
| 5,456,032 A | 10/1995 | Matsumoto et al. |
| 5,465,729 A | 11/1995 | Bittman et al. |
| 5,533,947 A | 7/1996 | Tomlinson et al. |
| 5,592,143 A | 1/1997 | Romney et al. |
| 5,662,117 A | 9/1997 | Bittman et al. |
| 5,670,985 A | 9/1997 | Cappels, Sr. et al. |
| 5,684,513 A | 11/1997 | Decker |
| 5,690,411 A | 11/1997 | Jackman |
| 5,726,672 A | 3/1998 | Hernandez et al. |
| 5,779,348 A | 7/1998 | Interlicchio |
| 5,815,225 A | 9/1998 | Nelson |
| 5,836,673 A | 11/1998 | Lo |
| 5,879,076 A | 3/1999 | Cross |
| 5,952,992 A | 9/1999 | Helms |
| 5,982,573 A | 11/1999 | Henze |
| 5,986,200 A | 11/1999 | Curtin |
| 6,001,048 A | 12/1999 | Taylor |
| 6,064,372 A | 5/2000 | Kahkoska |
| 6,146,006 A | 11/2000 | Cross |
| 6,161,944 A | 12/2000 | Leman |
| 6,179,432 B1 | 1/2001 | Zhang et al. |
| 6,191,939 B1 | 2/2001 | Burnett |
| 6,217,183 B1 | 4/2001 | Shipman |
| 6,230,047 B1 | 5/2001 | McHugh |
| 6,336,727 B1 | 1/2002 | Kim |
| 6,379,013 B1 | 4/2002 | Bechtel et al. |
| 6,467,924 B2 | 10/2002 | Shipman |
| 6,532,152 B1 | 3/2003 | White et al. |
| 6,538,567 B2 | 3/2003 | Stewart |
| 6,544,200 B1 | 4/2003 | Smith et al. |
| 6,549,179 B2 | 4/2003 | Youngquist et al. |
| 6,582,342 B2 | 6/2003 | Kaufman |
| 6,672,991 B2 | 1/2004 | O'Malley |
| 6,717,376 B2 | 4/2004 | Lys et al. |
| 6,754,021 B2 | 6/2004 | Kisaka et al. |
| 6,762,741 B2 | 7/2004 | Weindorf |
| 6,768,066 B2 | 7/2004 | Wehrenberg |
| 6,850,776 B1 | 2/2005 | Sandelius et al. |
| 6,870,529 B1 | 3/2005 | Davis |
| 6,891,525 B2 | 5/2005 | Ogoro |
| 6,897,624 B2 | 5/2005 | Lys et al. |
| 6,911,971 B2 | 6/2005 | Suzuki et al. |
| 6,918,677 B2 | 7/2005 | Shipman |
| 6,950,087 B2 | 9/2005 | Knox et al. |
| 6,956,564 B1 | 10/2005 | Williams |
| 6,977,335 B2 | 12/2005 | Georges et al. |
| 7,038,118 B1 | 5/2006 | Gimare |
| 7,060,008 B2 | 6/2006 | Watterson et al. |
| 7,078,607 B2 | 7/2006 | Alferness |
| 7,083,295 B1 | 8/2006 | Hanna |
| 7,113,196 B2 | 9/2006 | Kerr |
| 7,135,637 B2 | 11/2006 | Nishitani et al. |
| 7,156,773 B2 | 1/2007 | Takai et al. |
| 7,164,076 B2 | 1/2007 | McHale et al. |
| 7,177,672 B2 | 2/2007 | Nissila |
| 7,179,984 B2 | 2/2007 | Nishitani et al. |
| 7,183,480 B2 | 2/2007 | Nishitani et al. |
| 7,207,935 B1 | 4/2007 | Lipo |
| 7,224,282 B2 | 5/2007 | Terauchi et al. |
| 7,236,154 B1 | 6/2007 | Kerr et al. |
| 7,301,093 B2 | 11/2007 | Sater et al. |
| 7,311,658 B2 | 12/2007 | Elliott |
| 7,345,671 B2 | 3/2008 | Robbin et al. |
| 7,373,120 B2 * | 5/2008 | Messel ............... H04M 1/22 455/157.2 |
| 7,385,359 B2 | 6/2008 | Dowling et al. |
| 7,395,507 B2 | 7/2008 | Robarts et al. |
| 7,433,546 B2 | 10/2008 | Marriott et al. |
| 7,452,098 B2 | 11/2008 | Kerr |
| 7,473,839 B2 | 1/2009 | Gimare |
| 7,499,232 B2 | 3/2009 | Hodge et al. |
| 7,518,054 B2 | 4/2009 | McKinney et al. |
| 7,521,623 B2 | 4/2009 | Bowen |
| 7,526,333 B2 | 4/2009 | Yasushi et al. |
| 7,537,546 B2 | 5/2009 | Watterson et al. |
| 7,544,880 B2 | 6/2009 | Takai et al. |
| 7,683,252 B2 | 3/2010 | Oliver et al. |
| 7,691,031 B2 | 4/2010 | Toyama et al. |
| 7,706,637 B2 | 4/2010 | Marriott |
| 7,717,858 B2 | 5/2010 | Massad |
| 7,781,666 B2 | 8/2010 | Nishitani et al. |
| 7,790,976 B2 | 9/2010 | Takai et al. |
| 7,794,370 B2 | 9/2010 | Tackett |
| 7,825,319 B2 | 11/2010 | Turner |
| 7,841,965 B2 | 11/2010 | Shirai et al. |
| 2001/0010663 A1* | 8/2001 | Nakazawa et al. ............. 369/2 |
| 2002/0093483 A1* | 7/2002 | Kaplan ......................... 345/158 |
| 2002/0098876 A1* | 7/2002 | Engstrom ............... G06F 3/016 455/566 |
| 2002/0190975 A1* | 12/2002 | Kerr ........................ 345/211 |
| 2003/0079038 A1* | 4/2003 | Robbin et al. ............. 709/232 |
| 2004/0012556 A1 | 1/2004 | Yong et al. |
| 2004/0198455 A1* | 10/2004 | Deeds ................. H04M 1/22 455/566 |
| 2004/0204125 A1* | 10/2004 | Messel ................ H04M 1/22 455/566 |
| 2005/0077843 A1* | 4/2005 | Benditt ............... H05B 37/029 315/312 |
| 2006/0102171 A1 | 5/2006 | Gavish |
| 2006/0111621 A1 | 5/2006 | Coppi et al. |
| 2006/0112808 A1 | 6/2006 | Kiiskinen et al. |
| 2006/0169125 A1 | 8/2006 | Ashkenazi et al. |
| 2006/0288846 A1 | 12/2006 | Logan |
| 2007/0060446 A1 | 3/2007 | Asukai et al. |
| 2007/0074617 A1 | 4/2007 | Vergo |
| 2007/0074619 A1 | 4/2007 | Vergo |

FOREIGN PATENT DOCUMENTS

| | | |
|---|---|---|
| JP | 2001299980 | 10/2001 |
| JP | 2001306071 | 11/2001 |
| JP | 2002073018 | 3/2002 |
| JP | 2002298496 | 10/2002 |
| JP | 2003177749 | 6/2003 |
| JP | 2003177750 | 6/2003 |
| JP | 2004113552 | 4/2004 |
| JP | 2001307413 | 11/2011 |

OTHER PUBLICATIONS

Nick Bailey, "Issue 54: Sculptor: A Real Time Phase Vocoder", Oct. 1, 1998, Linux Journal.

Bociurkiw, Michael, "Product Guide: Vanessa Matz", www.forbes.com/asap/2000/1127/vmartz_print.html, Nov. 27, 2000.

"Traktor DJ Studio 2.0 with OS X Support Shipping", Press Release dated Nov. 15, 2002, http://new.harmony-central.com/Newp/2002/Traktor-DJStudio-20.html.

"12.1" 925 Candela Mobile PC", www.lcdhardware.com/panel1_1panel/default.asp, downloaded Dec. 19, 2002.

"BL82 Series Backlit Keyboards", www.tg3electronics.com/products/backlit/backlit.htm, downloaded Dec. 19, 2002.

"Industrial Keyboards & Pointing Devices", www.stealthcomputer.com/peripherals_oem.htm, downloaded Dec. 19, 2002.

"Poly-Optical UniGlo provides long life, low power, inert, maintenance free backlighting for all switch and control panel designs", www.polyoptical.com/membrane switches.html, downloaded Dec. 19, 2002.

"Rocky Matrix Backlit Keyboard", www.amrel.com/asi_matrixkeyboard.html, downloaded Dec. 19, 2002.

"Toughbook 28, Powerful, Rugged and Wireless", www.panasonic.com/computer/notebook/html/01a_s8.htm, downloaded Dec. 19, 2002.

"Tracer 2000 Computer", www.pst911.com/tracer.html, downloaded Dec. 19, 2002.

"Why Buy: ThinkPad", www.pc.ibm.com/us/thinkpad/easeofuse.html, downloaded Dec. 19, 2002.

(56) References Cited

OTHER PUBLICATIONS

Eluminx Home web page, www.eluminx.com, downloaded Dec. 19, 2002.
"TAOS, Inc., Announces Industry's First Ambient Light Sensor to Convert Light Intensity to Digital Signals", www.taosinc.com/pressrelease_090902.htm, downloaded Jan. 23, 2003.
"When it Comes to Selecting a Projection TV, Toshiba Makes Everything Perfectly Clear, Previews of New Releases", www.bestbuy.com/HorneAudloVideo/Specials/ToshibaTVFeatures.asp, downloaded Jan. 23, 2003.
Toshiba MK6017MAP 6.0 GB IDE 2.5" 9.5MM Notebook Hard Drive Specification, pp. 1-4, downloaded Apr. 29, 2003: http://shop.store.yahoo.com/netcomdirect/tosmk6017map.html.
Toshiba Shock Sensor Roadmap PPT Slide, Toshiba America Inc., p. 1, downloaded Apr. 29, 2003: http://www .toshiba.com/taec/components/Generic/PT_ShocksensorRoadMap.htm.
U.S. Appl. No. 10/791,495, filed Mar. 1, 2004.
"Advanced Safety Equipment; Led Armband", www.advancedsafetyeguipment.com/armband.html, downloaded Jul. 12, 2004.
"Lumitex Inc.; LCD Backlighting", www.lumitex.com/lcd_backlighting.html, downloaded Jul. 12, 2004.
"Protexion Plus Reflective Safety Harness/vest", http://protexion.alain-pelletier.com, downloaded Jul. 12, 2004.
Steve, "OK1 Claims Smallest 3-Axis Accelerometer", Aug. 25, 2004, downloaded Oct. 14, 2004, http://robots.net/article/1269.html.
"Sony Walkman Celebrates 25th Anniversary Milestone With the Launch of a Hard Drive Music Player", Sep. 29, 2004, Press Release, downloaded on Oct. 14, 2004, http://www.pcworld.idg.com.au/index.php/id;745457704.
"The PaceMaker Plug-in v2.02", Oct. 11, 2004, downloaded Oct. 20, 2004, http://sky.prohosting.com/oparviai/pacemaker/.
"Sony 20GB Network Walkman® Hard I Player", downloaded Oct. 14, 2004, http://www.sears.com/sr/javasr/product.do?BV SessionID=@@@@0015464848.109777 . . . .
"Table of Contents", Oct. 2001, No. 10, Sensors & Transducers e-Digest (S&T), downloaded Oct. 14, 2004, http://www.sensorsportal.com/HTML/DIGEST/Digest_Oct2001.htm.
"Honor for StepMan in the design competition the mVs 2004", downloaded Oct. 20, 2004, http://216.239.37. 04/translate_c?hl=en&sl=de&u=http://www. innovationsreport.de/htm . . . .
"Phase Vocoder", downloaded Oct. 20, 2004, http://www.mti.dmu.ac.uk/EARS/Data/node325.html.
N J Bailey, "Spectral manipulation with the Phase Vocoder", Oct. 13, 1998, downloaded Oct. 20, 2004, http://sculptor.sourceforge.net/Sculptor/lj/node2. html.
"Active MP3 DJ Studio", downloaded Oct. 28, 2004, http://www .multimediasoft.com/amp3dj/.
"DJ Software PRO—Mix Vibes PRO 4", downloaded Oct. 28, 2004, http://www .mixvibes.com/pages/mixvibespro4.html.
"Introducing GarageBand.", downloaded Oct. 28, 2004, http://vvww.apple.com/ilife/garageband/.
"Mixing & DJ Software for the Mac", downloaded Oct. 28, 2004, http://www.mp3-mac.com/Pages/MixDJ.html.
"Smooth 9.25HR Programs Designed for your Fitness Goals", downloaded Oct. 28, 2004, http://www.treadmillbynet.com/smooth925_programs.htm.
"The Mixer", downloaded Oct. 28, 2004, http://www.dj.deft.ukgatewav.net/mainpages/mixers.htm.
"The new iTunes.", downloaded Oct. 28, 2004, http://www .apple.com/ilife/itunes/.
"Treadmill Programs", downloaded Oct. 28, 2004, http://us.home.lifefitness.com/content.cfm/treadmillprograms.
"Virtual DJ Studio—MP3 Mixer", downloaded Oct. 28, 2004, http://www.vdj3.com/.
"What is music?", downloaded Oct. 28, 2004, http://www.mfiles.co.uk/other-what-is-music.htm.
"MP3Run 256 MB Digital Audio Player", http://www.nike-philips.com/product_details.jsp?lang=enj&product=MP3RUNpsa260, downloaded Oct. 28, 2004.
"How Music Affects Your Workout," downloaded Oct. 28, 2004, http://www.tinajuanfitness.info/articles/art082897.html.
"ADXL311—Low Cost, Ultra Compact, ±2 g, Dual Axis Accelerometer," downloaded Nov. 22, 2004, http://www.analog.com/en/prod/0,,764_800_ADXL311,00.html.
"Traktor DJ Studio 2 Ready for iTunes and iPod", downloaded Nov. 22, 2004, http://www.native-instruments.com/index.php?id=2270&tvpe=1.
"Traktor is the best Mp3 DJ Software", downloaded May 25, 2005, http://www.dj-tips-and-tricks.com/mp3-dj-software.html.
Mathias Mainka, "StepMan—matching music to your moves", Jan. 2004, CG Topics.
MK2001MPL (HDD1212) Hard Disk Drive, Product Specification, Toshiba Storage Device Division, Toshiba Corporation, Sep. 2000.
Szabo et al., "The Effects of Slow- and Fast-Rhythm Classical Music on Progressive Cycling to Voluntary Physical Exhaustion", Sep. 1999, The Journal of Sports Medicine and Physical Fitness, pp. 220-225.
HDK Acceleration Sensor, Hokuriku ACS010B specification, pp. 1-2.
"VIP Global Marketing; Safety Lights", www.vipglobal.com/safetylights.htm, downloaded Jul. 12, 2004.
Machine Translation of JP-2001211237 A.

\* cited by examiner

HANDHELD DEVICES AS VISUAL INDICATORS

CROSS REFERENCE APPLICATIONS TO RELATED APPLICATIONS

This application is a Continuation of U.S. application Ser. No. 12/128,586, entitled "HANDHELD DEVICES AS VISUAL INDICATORS" and filed on May 28, 2008, which is a Continuation of U.S. application Ser. No. 10/889,933, entitled "HANDHELD DEVICES AS VISUAL INDICATORS," filed Jul. 12, 2004, which issued on Nov. 10, 2009 as U.S. Pat. No. 7,616,097; both of which are hereby incorporated herein by reference.

BACKGROUND OF THE INVENTION

Field of the Invention

The present invention relates generally to portable hand held computing devices. More particularly, the present invention relates to portable hand held computing devices that utilize a backlit display as a visual indicator.

Description of the Related Art

Portable hand held electronic devices (such as PDAs, telephones and music players) have incorporated liquid crystal displays (LCD) to visually display text and graphics to users. In some cases, the LCDs have included backlighting, which illuminates the LCD from behind so that the text and graphics can be easily seen in low light conditions. The backlighting is typically user selected, i.e., the user can turn the backlighting on and off. As is generally well known, this may be accomplished with onscreen options or switches located on the device. When on, the intensity of the luminance typically stays at a constant level so as to not adversely effect or impact the user during use. In essence, backlighting is similar to traditional lights found in homes, cars, flashlights, etc. That is, they must be switched on and off, and when on they only output at a constant level.

Other types of electronic devices as for example computers, computer monitors, televisions, and stereo equipment, have incorporated small indicators to visually alert users of a particular status of the electronic device as for example whether the device is on or off. These indicators typically include a small clear plastic insert, which is located in front of a light emitting diode (LED), and which is inserted within an opening in the housing of the electronic device thus causing it to protrude outside the housing. Alternatively, the LED itself may be placed in the opening in the housing such that it protrudes outside the housing. While indicators such as these work well, they are limitations when applying them to smaller handheld devices. For one, handheld devices have limited space, which makes placement of these types of indicators difficult. In addition, the indicators always exist at the surface of the housing thereby creating breaks, lines, pits, protrusions, which are aesthetically unpleasing and degrade the look of the hand held electronic device. Moreover, the indicators typically cover a small area and only provide a slight amount of illumination thereby making them difficult to see clearly, especially from far distances.

In view of the foregoing, what is desired is a portable handheld electronic device having a back lit display that produces a varying light effect, and that can be used as a visual indicator.

SUMMARY OF THE INVENTION

The invention relates, in one embodiment, to a mobile handheld computing device configured for operation as a media player and for operation as a safety reflector or light in low light and no light conditions. The computing device has a light source configured to output a beacon light effect that alerts others to the presence of the user of the computing device when the user is in low light or no light conditions. The beacon light effect may include blinking, fading in and out, ebbing, pulsating or strobing. The light source may for example be part of a backlit display.

The invention relates, in another embodiment, to a computer implemented method performed on a hand held computing device having a backlit display. The method includes receiving a light command and controlling the back lighting in accordance with the light command. The light command varies a characteristic or attribute of the light generated by the backlit display in order to provide visual indicia on the backlit display.

The invention relates, in another embodiment, to a hand held media player having a display with backlighting. The display is configured to present text or graphics to a user. The backlighting is configured to provide visual stimulus for relaying information to a user or a user's surroundings.

The invention relates, in another embodiment, to a media player system. The system includes a media device controller that directs inputs and outputs between an input device, display, one or more light sources and a speaker. The media device controller includes a media player module that controls the overall activity of the media player system. The media device controller also includes a GUI module that controls information presented on the display. The media device controller further includes a mode selector module that controls whether the media player system is in one of a plurality of light modes. The media device controller additionally includes a light module that controls the operation of the light source based on which light mode is selected.

The invention relates, in another embodiment, to a computer implemented method performed on a hand held computing device having a backlit display. The method includes presenting a menu on the backlit display. The menu includes a backlighting feature. The method also includes determining if the backlighting feature is selected. The method further includes retrieving backlighting options when the backlighting feature is selected. The method additionally includes presenting the backlighting options on the backlit display. The backlighting options include at least first and second options, each of which represent different modes of backlighting. Moreover, the method includes determining if the first or second option is selected, retrieving a light setting associated with the first option when the first option is selected or a light setting associated with the second option when the second option is selected, and outputting a first light effect with the back lighting based on the first light settings or outputting a second light effect with the back lighting based on the second light settings.

BRIEF DESCRIPTION THE DRAWINGS

The invention will be readily understood by the following detailed description in conjunction with the accompanying drawings, wherein like reference numerals designate like structural elements, and in which.

DETAILED DESCRIPTION OF THE INVENTION

The invention generally pertains to portable hand held computing devices, which provide luminance via one or more light sources. More particularly, the invention pertains to systems and methods for controlling the light sources so that the portable hand held computing devices better communicate with the user, and the user's surroundings. One aspect of the invention relates to light systems with multiple functionality or modes. For example, the backlit display of the portable hand held computing device, which typically provides luminance for clearly viewing the characters presented on the display, may additionally act like a visual indicator for relaying information to the user or the user's surroundings. In some cases, the backlit display may be operated as a light beacon or safety light especially in low light situations. Another aspect of the invention relates to light systems that can be controlled to produce lighting with varying illumination patterns. For example, the backlighting may be configured to blink, fade, ebb, pulsate, strobe, etc. In some cases, it may even be configured to change color.

Embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
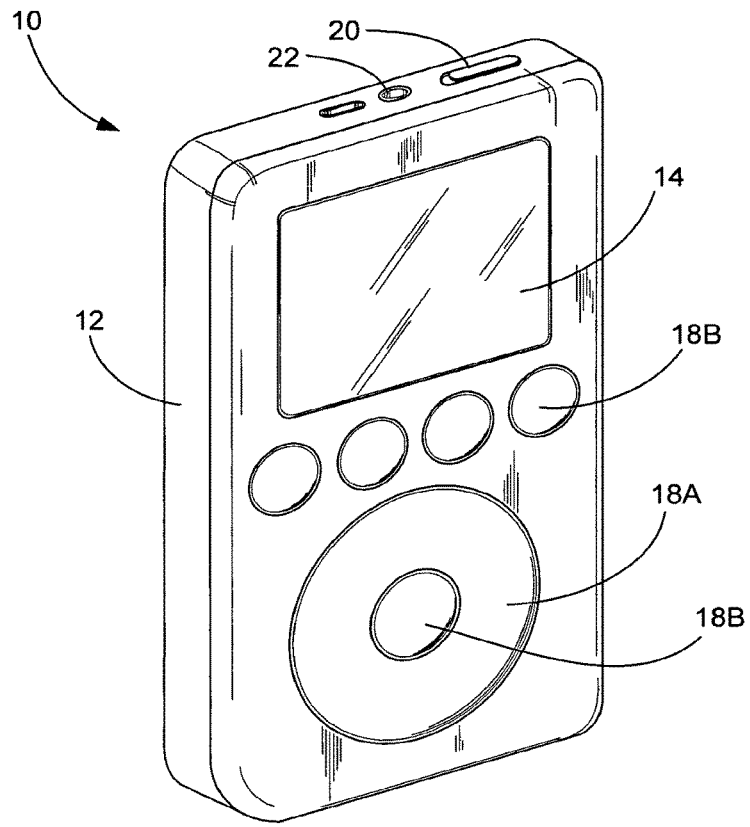
FIG. 1 is perspective view of a handheld computing device, in accordance with one embodiment of the present invention.

FIG. 1 is perspective view of a handheld computing device 10, in accordance with one embodiment of the present invention. The computing device 10 is capable of processing data and more particularly media such as audio, video, images, etc. By way of example, the computing device 10 may generally correspond to a music player, game player, video player, camera, cell phone, personal digital assistant (PDA), and/or the like. With regards to being handheld, the computing device 10 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

As shown, the computing device 10 includes a housing 12 that encloses and supports internally various electrical components (including integrated circuit chips and other circuitry) to provide computing operations for the device. The integrated circuit chips and other circuitry may include a microprocessor, memory, a battery, and various input/output (I/O) support circuitry. In most cases, the microprocessor executes instructions and carries out operations associated with the computing device. For example, using instructions retrieved for example from memory, the microprocessor may control the reception and manipulation of input and output data between components of the computing device 10. In fact, the microprocessor may work with an operating system to execute computer code and produce and use data stored in memory. By way of example, the memory may include a hard drive, flash memory, Read-Only Memory (ROM), Random-Access Memory (RAM) and/or the like.

The computing device 10 also includes a display 14. The display 14, which is assembled within the housing 12 and which is visible through an opening in the housing 12, is used to display a graphical user interface (GUI) as well as other information to the user (e.g., text, objects, graphics). The display 14 generally takes the form of a flat panel display such as a liquid crystal display (LCD). In some cases, the display 14 is a backlit display. Backlighting refers to illumination that comes from behind the display (e.g., polarizing filters, liquid crystal cells, color filters, glass plate in the case of an LCD) so that the displayed objects stand out vividly against the background. Backlighting typically causes the foreground, which includes the graphical images produced by the display 14, to appear sharper or more distinct in contrast to the background. This makes the display easier to read in low and no light conditions (conditions that typically make the computing device unusable).

Backlighting is typically produced by one or more light sources positioned above, beside or behind the display. The lights may for example correspond to light emitting diodes or fluorescent tubes. In some cases, a diffuser sits behind the LCD and redirects and scatters the light evenly to ensure a uniformly illuminated display. The diffuser may be a panel or one of more flexible light pipes that a grouped together. The backlighting may be controlled with external switches and/or through the GUI interface of the computing device.

The computing device 10 also includes one or more input devices 18 configured to transfer data from the outside world into the computing device 10. The input devices 18 may for example be used to perform tracking/scrolling, to make selections or to issue commands in the computing device 10. By way of example, the input devices 18 may correspond to keypads, joysticks, touch screens, touch pads, track balls, wheels, buttons, switches, and/or the like. In the illustrated embodiment, the computing device 10 includes a touch pad 18A and a plurality of buttons 18B, which are assembled within the housing 12 and which are accessible through openings in the housing 12.

The computing device 10 may include one or more switches 20 including power switches, hold switches, and the like. Furthermore, the device 10 may include one or more connectors 22 including data ports, jacks, power terminals, etc.

In the illustrated embodiment, the computing device 10 is a pocket sized hand held music player that allows a user to store a large collection of music, and to listen to this music on the go (e.g., while working, traveling, exercising, etc.). In the case of a music player, the memory may contain music playing software, play lists containing a plurality of songs, etc. Furthermore, the GUI may visually provide menus, play lists, music controls and/or the like to the user. Moreover, the touch pad may provide scrolling functions, which allow a user to traverse through menus or play lists on the GUI and the buttons may provide button functions that open a menu, play a song, fast forward through a song, seek through a menu and/or the like. In addition, the music player typically includes an audio jack for outputting audio and a data port for transmitting and receiving audio data (and other data.) to and from a host device. By way of example, the music player may correspond to the iPod series MP3 players manufactured by Apple Computer of Cupertino, Calif.

Referring back to the display 14, the backlighting is configured with additional functionality in that it is capable of acting like a visual indicator unlike conventional backlighting which is dumb (on/off). That is, the backlit display 14 may produce a light effect that reflects the desires and mood of the user, that reflects inputs or outputs for the device (or host), or that reacts to tasks associated with the operation of the device (or host). By way of example, the light behavior may include emitting a particular glow or intensity, pulsing on and off or cycling with increasing and decreasing intensity. In essence, the back lighting provides visual stimulus to the user outside of its normal use.

The backlighting may be controlled by a user event or it may be controlled based on some other event including events associated with computing device 10 or to events associated with a device operatively coupled to the computing device 10. With a user selected event, the user makes a selection either through a switch or the GUI in order to effect the backlighting in a non trivial manner. For example, the user may select different backlighting modes, each of which performs a different type of backlighting. With an I/O event, the device itself adjusts the backlighting in accordance with a particular input or output. For example, the illumination of the backlighting may change when uploading or downloading data to/from a host device. With a programming event, the device adjusts the backlighting in accordance with a particular programming event. For example, the illumination of the backlighting may change in accordance with the music being played on a music player.

The backlighting can be operated in several modes including for example standard mode, alert mode, night beacon mode, music mode and the like. In standard mode, the backlighting provides luminance to the display 14 so that the images on the display 14 can be easily seen. In alert mode, the back lighting is controlled so as to alert a user when particular event has occurred in the computing device 10. In night beacon mode, the backlighting is controlled so as to produce a beacon signal that warns others of the user's presence. In music mode, the backlighting is controlled in accordance with the music being played on the computing device.

To expand on the night beacon mode, the backlit display 14 can be operated as a safety reflector or light in low light and no light situations to warn oncoming traffic of the user's presence. The computing device 10 essentially combines the functionality of the computing device 10 with a conventional safety light. The user therefore does not have to wield multiple devices when jogging, biking, walking, etc. As should be appreciated, it is typically desirable to reduce the amount of devices on ones person when performing these activities. In general, once the night beacon mode is turned on, the backlit display 14 begins to output a beacon light effect. The light beacon effect may be widely varied. For example, the beacon light effect may be associated with blinking, fading in and out, ebbing, pulsating, strobing, etc. In battery operated devices, the beacon light effect may even be designed in a manner that minimizes power consumption while maximizing its visual impact to oncoming traffic. While the beacon light effect is being performed, the user can hold the computing device 10 or strap it to a portion of their body, hopefully with the backlit display 14 facing out so that oncoming traffic can see the beacon light effect thereby alerting them that something is there.

Figure 2:
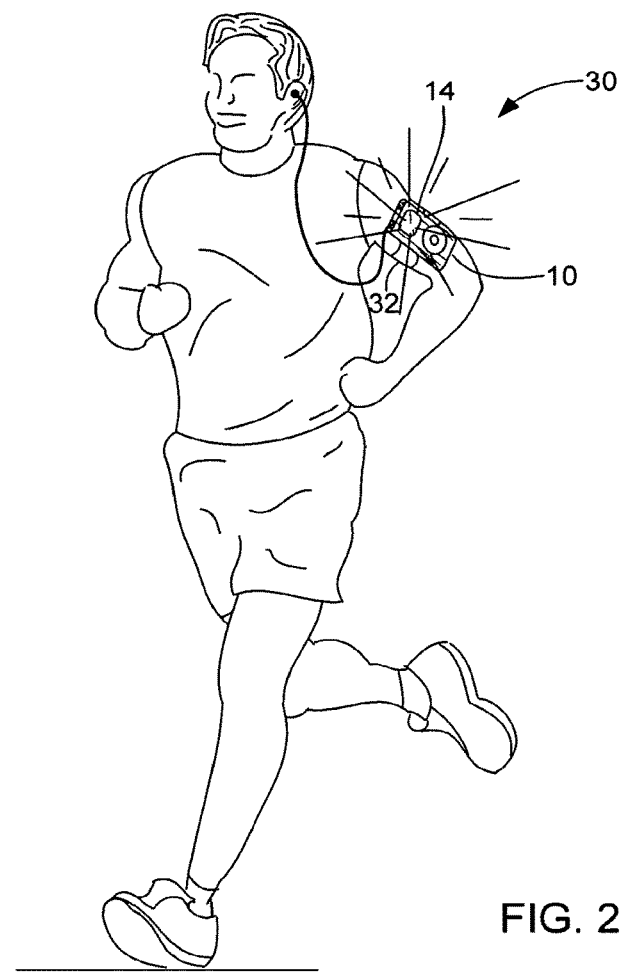
FIG. 2 illustrates a jogger wearing an arm clip with an illuminated computing device attached thereto, in accordance with one embodiment of the present invention.

In some cases, the computing device 10 may include or be positioned within a clip that secures the device to a portion of the body or an article of clothing. In cases such as these, the user does not have to hold the device when jogging, biking, walking, etc. and further the backlit display is positioned in manner that makes it highly visible to oncoming traffic whether from a car, jogger, a bicyclist, walker, etc. By way of example, FIG. 2 illustrates a jogger 30 wearing an arm clip 32 with the computing device 10 attached thereto. As shown, the backlit display 14 of the computing device 10 is outputting a beacon light effect that helps warn oncoming traffic of the joggers presence. Examples of clips can be found in copending case Ser. No. 29/196,833, which is herein incorporated by reference.

Although the night beacon mode is typically user selected, in some cases, the night beacon mode may be implemented based on signals, conditions or status of the computing device 10. The computing device 10 may include one or more sensors or have one or more sensors coupled thereto, which help initiate the beacon light effect. For example, the computing device 10 may include a light sensor, an accelerometer, heart rate monitor, temperature monitor, and/or the like. With regards to light sensor, the light sensor may instruct the backlighting to perform the beacon light effect when it detects low light conditions. That is, with help from a light sensor, the computing device may automatically place itself in a light beacon mode when the ambient light is at a predetermined level, i.e., the user does not have to select the beacon option on the user interface (whether a switch or GUI). With regards to accelerometer, the accelerometer may instruct the backlight to perform the beacon light effect when the user and therefore the computing device 10 is in motion. With regards to the heart temperature monitor, the monitor may instruct the backlight to perform beacon light effect when the user's heart rate or temperature is in an increased state. Alternatively, the beacon light effect may be initiated by programming. For example, the light beacon effect may be initiated when a particular song or group of songs is played on the music player as for example when a "night jog" play list is selected. An example of a light system utilizing a light sensor may be found in U.S. patent application Ser. No. 10/402,311, which are herein incorporated by reference.

It should also be noted that the control signal associated with the beacon light effect may be additionally or alternatively outputted to other light sources, whether internal or external to the computing device 10. For example, the beacon light effect may be outputted from one or more LEDs positioned at the exterior of the computing device 10. In cases such as this, the LEDs may be positioned at multiple positions around the device in order to cover a substantial portion of the device so that the light outputted therefrom can be seen by oncoming traffic. In addition, the beacon light effect may be additionally or alternatively outputted from illuminated buttons (backlit), connectors and indicators that are already located on the device. Furthermore, the beacon light effect may be additionally or alternatively outputted from illuminated peripheral or host devices. For example, the beacon light effect may be outputted from illuminated arm bands, head bands, jackets, vests, belts and/or the like, which are operatively coupled to the computing device 10. Moreover, the beacon light effect may be additionally or alternatively outputted from one or more light sources positioned internal to the device 10 and which illuminate the housing 12 of the device 10. Some examples of the light systems which can be used may be found in U.S. patent application Ser. Nos. 09/389,915, 10/075,964, 10/773,897, 10/075,520 and U.S. Pat. No. 6,357,887, which are herein incorporated by reference.

Figure 3:
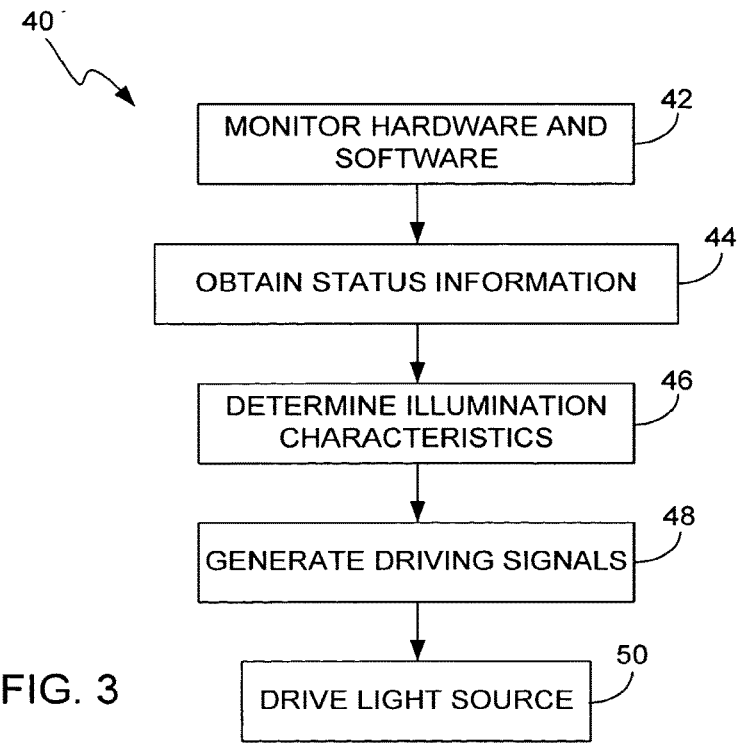
FIG. 3 is a flow diagram of illumination processing, in accordance with one embodiment of the invention.

FIG. 3 is a flow diagram of illumination processing 40, in accordance with one embodiment of the invention. The illumination processing 40 is performed by a computing device such as the one shown in FIG. 1 to provide the computing device with an illumination effect, as for example, the illumination of the backlit display.

The illumination processing 40 generally begins at block 42 where the device hardware and software is monitored. Here, one or more components associated with the device can be monitored. By way of example, the components being monitored can include one or more of a microprocessor, an operating system, an application or utility program, or input/output (I/O) devices.

After block 42, the process proceeds to block 44 where status of the components is obtained from the monitoring. By way of example, status may correspond to I/O connectivity status, wireless connectivity status, network connectivity status, processor status (e.g., sleep, shutdown), program status (e.g., errors, alerts, awaiting inputs, received new mail, loading), selection status (e.g., switches, GUI options), remote status (e.g., retrieving information from the internet or host), and/or the like.

After block 44, the process proceeds to block 46 where illumination characteristics are determined. Illumination characteristics generally refer to how a light source is illuminated to produce an illumination effect. The illumination characteristics are generally based on the status information and predetermined configuration information. The predetermined configuration information may identify a type and nature of the illumination (e.g., duration, intensity, sequence, color, etc.) that is to be provided for a specific status. The predetermined configuration information may be stored in a database of the computing device. Thus, the computing device consults the information held in the database in order to determine the illumination characteristics for a specific event.

In some cases, the predetermined configuration information stored in the database may be accessed by a user through a light control menu, which may be viewed on a display screen as part of a GUI interface. The light control menu may include light control settings pertaining to one or more events of the computing device. In fact, the light control menu may serve as a control panel for reviewing and/or customizing the light control settings, i.e., the user may quickly and conveniently review the light control settings and make changes thereto. Once the user saves the changes, the modified light control settings will be employed (e.g., as predetermined configuration information) to handle future events transmitted and/or received through the computing device.

After the illumination characteristics have been determined, the process proceeds to block 48 where driving signals for light sources are generated in accordance with the illumination characteristics, and thereafter used to control the light sources. In the case of the backlit display, driving signals for the back lights are generated. Alternatively, the driving signals may be used to control other light sources associated with the computing device as for example indicator lights, housing lights and even light sources associated with peripheral devices operatively coupled to the computing device.

The various aspects of the illumination processing described above can be used alone or in various combinations. The illumination processing is preferably implemented by a combination of hardware and software, but can also be implemented in hardware or software. The illumination processing can also be embodied as computer readable code on a computer readable medium. The computer readable medium is any data storage device that can store data, which can thereafter be read by a computer system.

Figure 4:
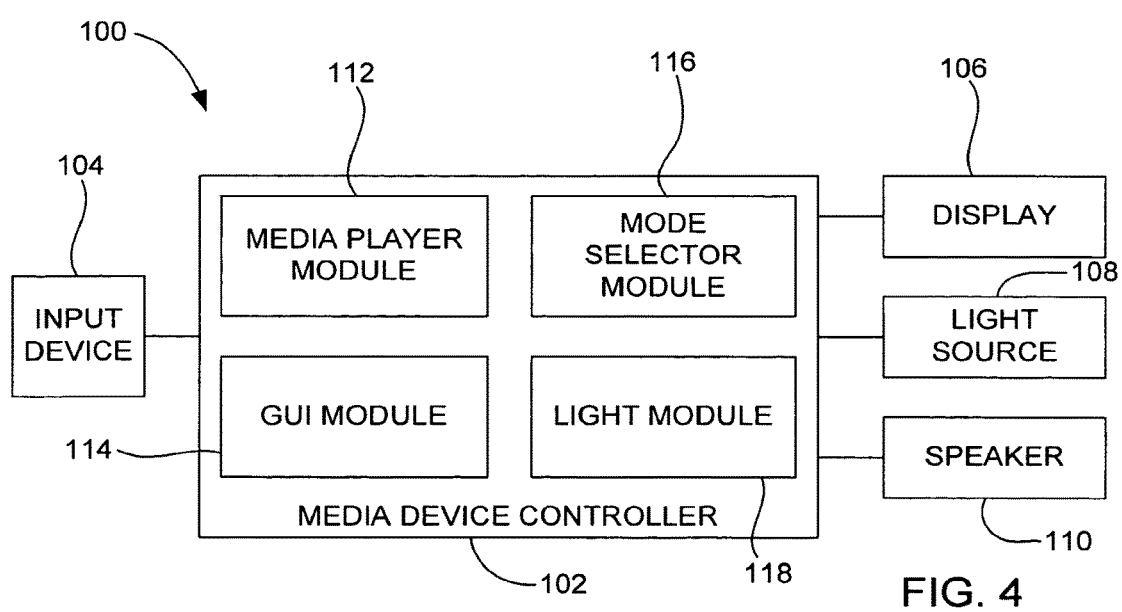
FIG. 4 is a block diagram of a media player system, in accordance with one embodiment of the present invention.

FIG. 4 is a block diagram of a media player system 100, in accordance with one embodiment of the present invention. The media player system generally includes a media device controller 102 that directs inputs and outputs between an input device 104, a display 106, one or more light sources 108 and a speaker 110. By way of example, the input device 104 may be a touch pad or button, the display 106 may be an LCD, the light source 108 may be the backlighting associated with a backlit display, and the speaker 110 may be a headphone.

The media device controller 102 includes several modules, which may be hardware, software, or a combination of both hardware and software. As shown, the media device controller 102 includes at least a media player module 112, a GUI module 114, a mode selector module 116 and a light module 118. The modules may work individually or together with other modules in order to process media information. The media player module 112 is primarily configured to run the media aspects of the media player system 100. That is, the media player module 112 controls the overall activity of the media player system 100. For example, the media player module 112 may include capabilities for inputting and outputting audio information. The GUI module 114 controls the information presented on the display 106. The GUI module 114 may for example present a graphical user interface in the form of text or graphics on the display 106. The mode selector module 116 controls which mode the media player 100 is in. For example, in the case of light modes, whether the media player 100 is in a standard, or enhanced mode. The light module 118 controls the light operation of the light source 108. That is, the light module produces driving signals, which drive the light source 108. The light module 118 may include a set of instructions that tell the light module 100 what to do with the light source 108 based on what mode the mode selector 116 module is in. By way of example, the light module 118 may instruct the light source 108 to perform standard lighting or enhanced lighting based on preprogrammed instructions.

During one particular operation of the system, the GUI module 114 (for example after referring to the mode selector module 116) presents a list of light modes on the display 106. Using the input device 104, the user selects one of the light modes from the list of light modes. By way of example, the user may use a touch pad to move a selector bar though the list of light modes and a button to select the desired light mode, i.e., the mode around which the selector bar is positioned. The mode selector module 116 receives the selection signal, and changes the light mode based on the selection signal. Once the light mode has been set, the selected light mode will be employed to handle future light events. In some cases, the mere selection of the light mode will initiate the light event associated with the light mode. In other cases, another selection operation needs to be performed to begin the light event associated with the light mode. For example, the user may need to turn the light feature on via a switch or through a GUI menu similar to above. In either case, once the light event is initiated, the light module 118 begins to control the light source based on the selected mode. For example, if the selected mode was a standard light mode, then the light module 118 would instruct the light source 108 to perform standard light effects, and if the selected mode was an enhanced light mode, then the light module 118 would instruct the light source 108 to perform enhanced light effects (as for example dynamic light effects associated with alerts, beacons, music, etc.).

Figure 5:
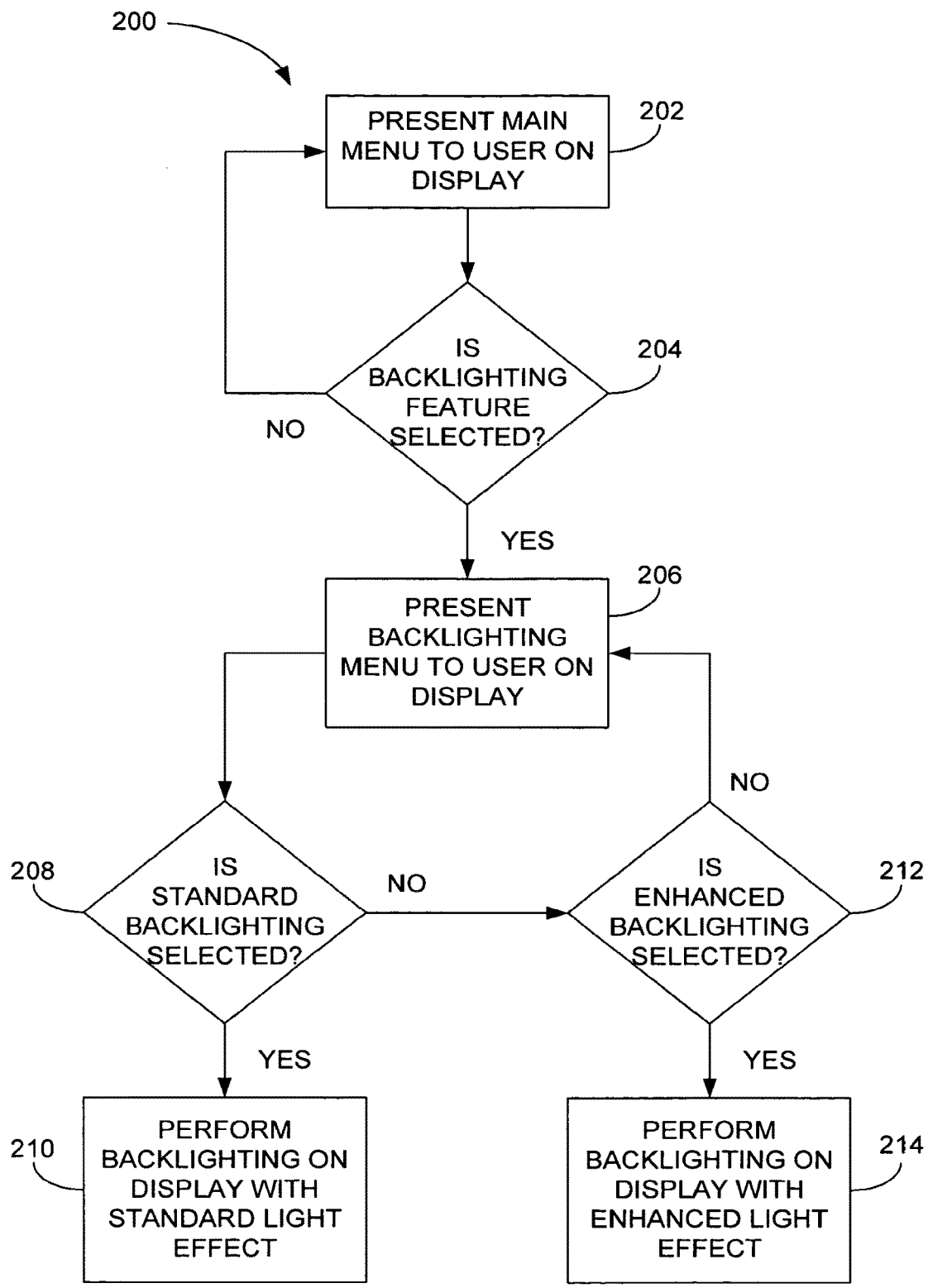
FIG. 5 is a computing device operational method, in accordance with one embodiment of the present invention.

FIG. 5 is an operational method 200, in accordance with one embodiment of the present invention. The operational method 200 may for example be performed on the computing device shown in FIG. 1 and/or on the media player system shown in FIG. 4. The method 200 generally begins at block 202 where a main menu is presented to a user on a display. See for example FIG. 6A, which shows the main menu 250 presented on the display 14. The main menu 250 generally includes several options 252 associated with operating the computing device 10. By way of example, the main menu 250 may include options 252 such as play lists, browse, extras, settings and backlight. In most cases, each of the options 252 includes its own sub menu of sub options, which are associated with the main option.

Figure 6A:
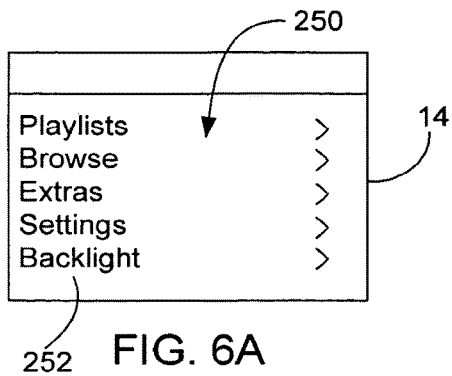
FIGS. 6A-6H show various screen shots of a computing device, in accordance with one embodiment of the present invention.
Figure 6B:
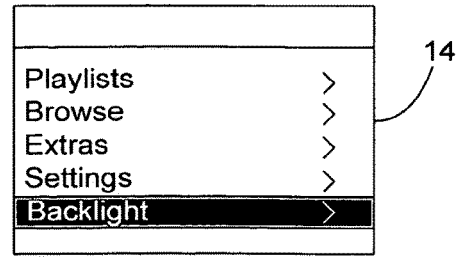
Figure 6C:
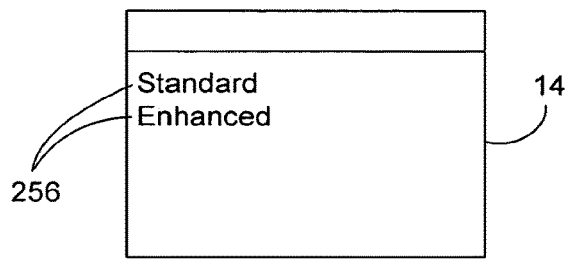

Following block 202, the method proceeds to block 204 where a determination is made as to whether the backlighting option was selected. If not, the method proceeds back to block 202. If so (as shown in FIG. 6B), the method proceeds to block 206 where the backlighting sub menu is presented to the user on the display. By way of example, see FIG. 6C which shows the backlighting sub menu 254 presented on the display 14. The backlighting sub menu 254 generally includes one or more backlighting options 256, which represent different modes of backlighting. In the illustrated embodiment, the sub menu 254 includes at least a first option 256A and a second option 256B. Each of these options 256 is configured to initiate a different control operation when selected. For example, the first option may initiate standard backlighting (e.g., illuminating the GUI) and the second option may initiate enhanced backlighting (e.g., alerts, night beacon, program status, etc.).

Figure 6D:
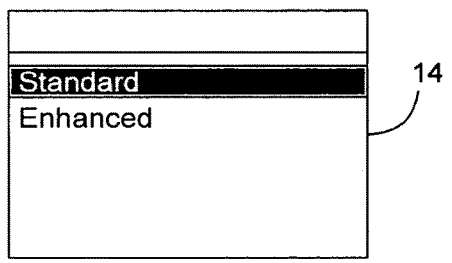
Figure 6E:
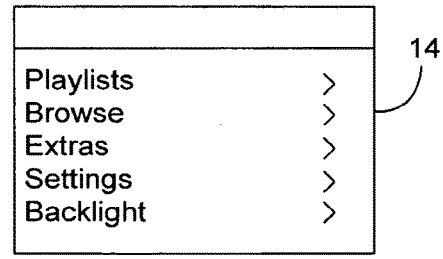

Following block 206, the method proceeds to block 208 where a determination is made as to whether the first option is selected. If it is selected (as shown in FIG. 6D), the method proceeds to block 210 where a first light effect is performed by the backlighting of the display. In the case of standard backlighting, a standard light effect is performed. The standard light effect is associated with normal backlighting where illumination is provided at a constant intensity so that the graphical images displayed on the GUI can be seen more clearly. By way of example, see FIG. 6E, which shows backlighting via a white background (as opposed to a darker background shown in the other figures) and FIG. 7A, which is a graphical plot of light intensity vs. time for a standard light effect. In some cases, in addition to providing standard backlighting, the GUI may revert back to the main menu when the first option is selected.

Figure 6F:
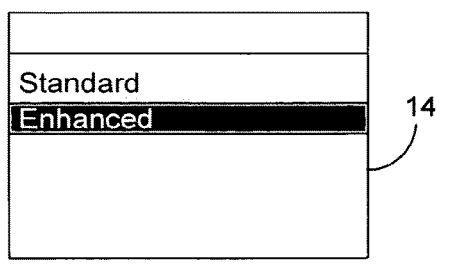
Figure 6G:
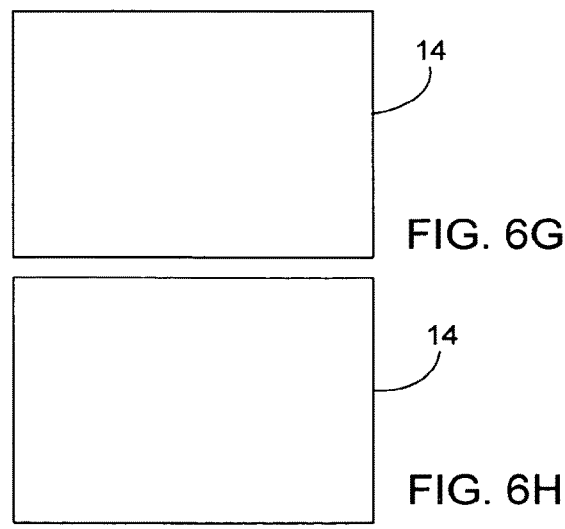
Figure 6H:

If the first option is not selected, the method proceeds to block 212 where a determination is made as to whether the second option is selected. If it is selected (as shown in FIG. 6F), the method proceeds to block 214 where a second light effect is performed by the backlighting of the display. In the case of enhance backlighting, an enhanced light effect is performed. For example, instead of continuously outputting the same intensity as in block 210, the light intensity may be variable so as to produce a dynamic light effect rather than a static one. By way of example, the enhanced light effect may include toggling between backlighting OFF and backlighting ON (as shown in FIGS. 6G and 6H). Alternatively, the backlighting may fade between backlighting OFF (intensity low) and backlighting ON (intensity high). The enhanced light effect may be associated with an alert mode, night beacon mode, program mode etc. In some cases, the GUI images may disappear when the enhance light effect is selected. In other cases, the GUI may revert back to the main menu or generate a static or dynamic symbol. For example, the GUI may present "beacon", when in the night beacon mode.

Figure 7A:
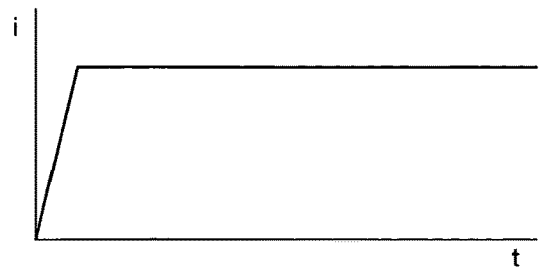
FIGS. 7A-7G are graphical plots showing various light effects, in accordance with several embodiments of the present invention.
Figure 7B:
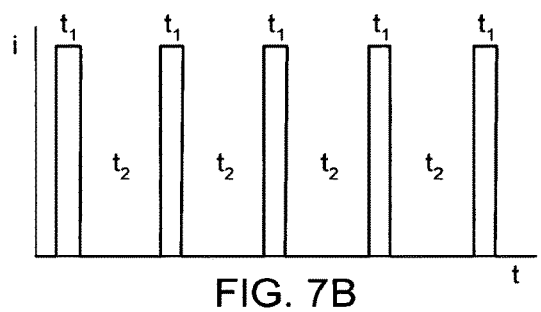
Figure 7D:
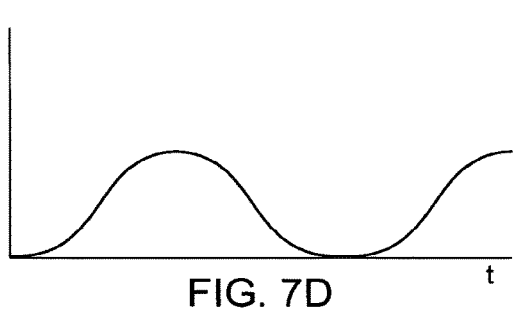
Figure 7C:
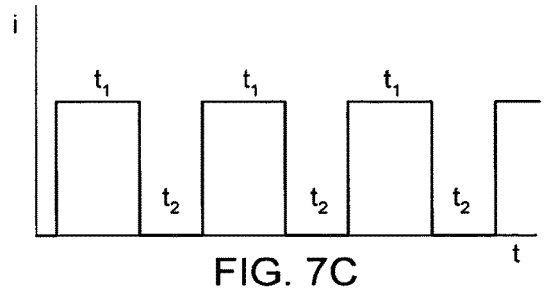
Figure 7E:
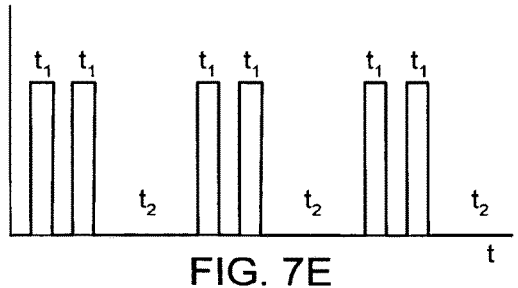
Figure 7F:
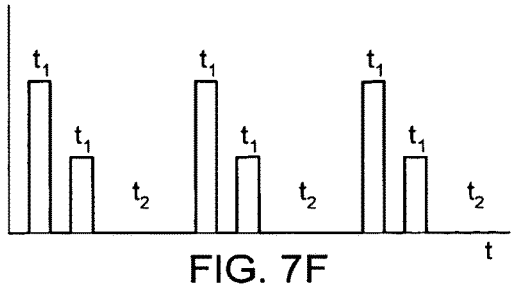
Figure 7G:
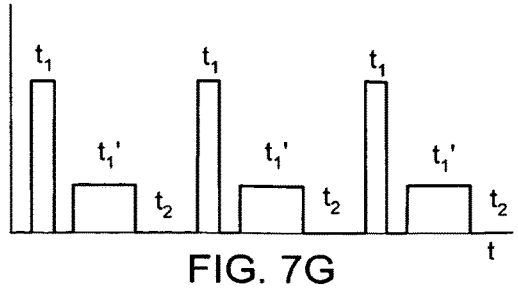

Several enhanced light effects are shown in FIGS. 7B-7E, each of which is a graphical plot showing light intensity vs. time. As shown in FIG. 7B, the backlighting is turned on for a period t1 and off for a period t2. FIG. 7C is similar to FIG. 7B, however, the amount of time for both t1 and t2 have changed as well as the intensity level when compared to FIG. 7B. As shown in FIG. 7D, the backlighting fades in and out through various levels of intensity (continuous change). As shown in FIG. 7E, there are two quick pulses at t1 and a pause t2 therebetween. As shown in FIG. 7F, the first pulse is at a first intensity and the second pulse is at a second intensity. As shown in FIG. 7G, the first pulse is occurs for a first duration t1 and the second pulse occurs for a second duration t1', which is longer than the first duration t1. It should be noted that these illustrations are not a limitation and that many more light effects may be performed. For example, although these Figures primarily show preset and continuous patterns, it should be noted that random patterns or individual pulses may also be used.

Figure 8:
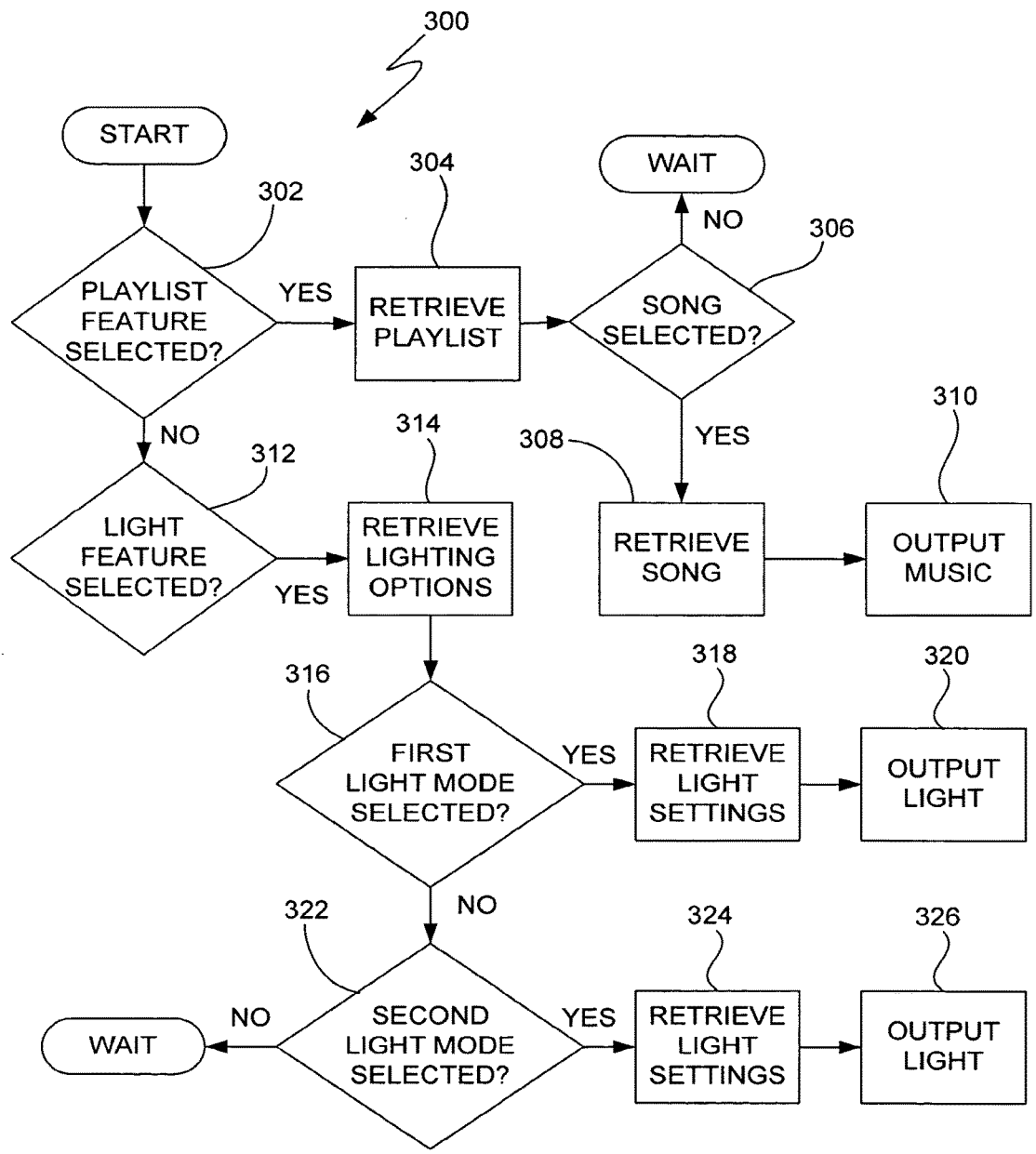
FIG. 8 is a media player method, in accordance with one embodiment of the present invention.

FIG. 8 is a media player method 300, in accordance with one embodiment of the present invention. The method 300 begins at block 302 where a determination is made as to whether or not a play list feature is selected. The play list feature may be part of a main menu. If a play list feature is selected, the method proceeds to block 304 where the play list is retrieved. The play list may for example be retrieved from memory. In some cases, once the play list is retrieved the play list is presented on a display as part of a GUI. The user can therefore scroll through the play list in order to find the desired song. After the play list is retrieved, the method proceeds to block 306 where a determination is made as to whether or not a song is selected. If a song is not selected, the method waits or times out (thereby causing the method to proceed back to the beginning). If a song is selected, the method proceeds to block 308 where the song is retrieved. The song may for example be retrieved from memory. In some cases, once the song is retrieved, information about the song is presented on a display as part of a GUI. Alternatively, the GUI may remain in the play list, revert back to a main menu or even go blank. Following block 308, the method proceeds to block 310 where the music associated with the song is outputted as for example to speakers or head phones. Thereafter, the method typically proceeds back to the beginning.

Referring back to block 302, if the play list feature is not selected, the method proceeds to block 312 where a determination is made as to whether or not a light feature is selected. Like the play list feature, the light feature may be part of a main menu. If the light feature is not selected the method proceeds back to block 302. If the light feature is selected, the method proceeds to block 314 where lighting options are retrieved. The lighting options, which may include various modes of the light feature, may for example be retrieved from memory. By way of example, the lighting options may include a first and second light mode where each mode operates the light feature differently. Following block 314, the method proceeds to block 316 where a determination is made as to whether or not a first light mode is selected. If a first light mode is selected, the method proceeds to block 318 where light settings associated with the first light mode are retrieved. The light settings may for example be retrieved from memory. The light settings generally include information on how the light is to be controlled. Following block 318, the method proceeds to block 320 where the light is outputted based on the light settings. Thereafter, the method typically proceeds back to the beginning.

Referring back to block 316, if the first light mode is not selected, the method proceeds to block 322 where a determination is made as to whether or not a second light mode is selected. If a second light mode is not selected (or any additional light modes), the method waits or times out (thereby causing the method to proceed back to the beginning) If the second light mode is selected, the method proceeds to block 324 where light settings associated with the second light mode are retrieved. The light settings may for example be retrieved from memory. The light settings generally include information on how the light is to be controlled. Following block 324, the method proceeds to block 326 where the light is outputted based on the second light settings. Thereafter, the method typically proceeds back to the beginning.

In one embodiment, the first light mode corresponds to a standard light mode and the second light mode corresponds to a safety or beacon light mode. In the standard light mode, the light source (e.g., backlighting) stays on at a constant level so that the GUI can be more easily viewed. In the beacon light mode, the light source (e.g., backlighting) varies its intensity so as to provide visual indication.

Figure 9:
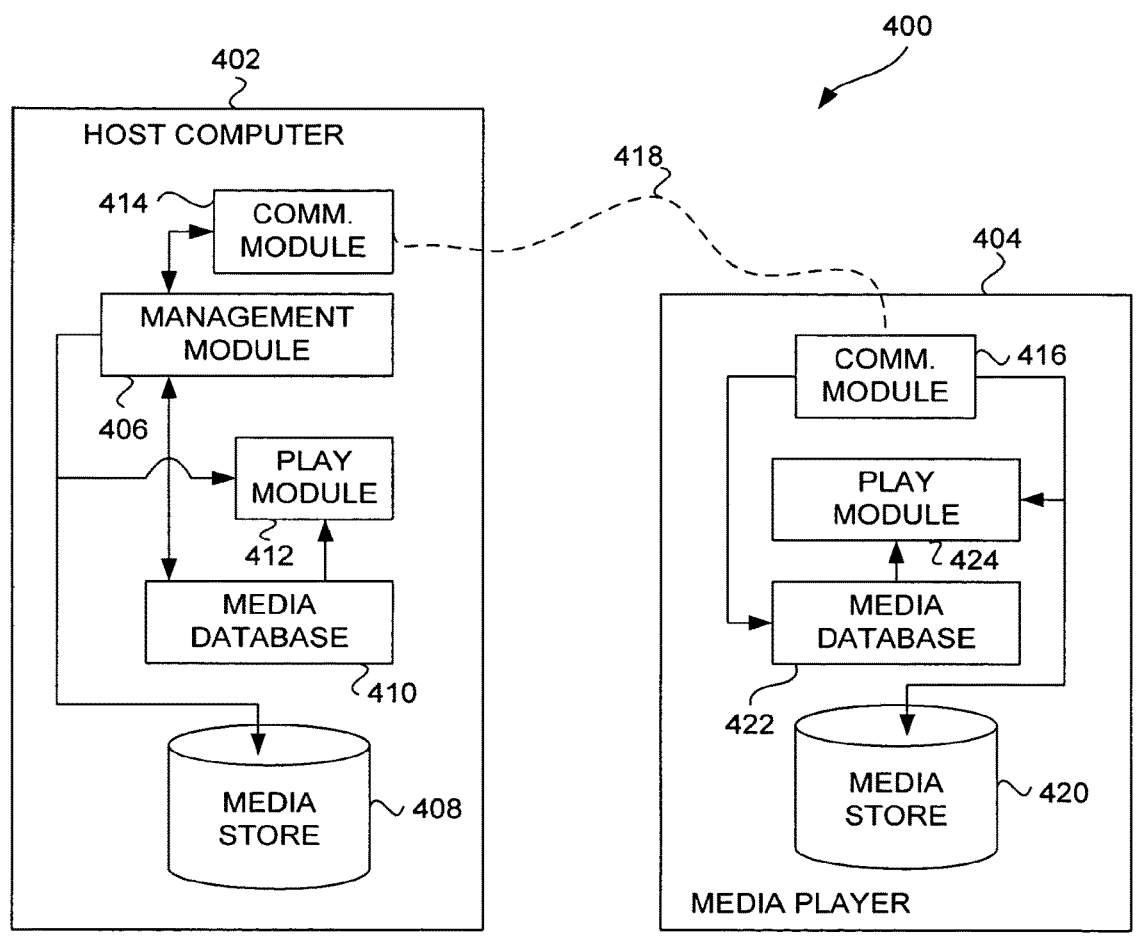
FIG. 9 is a block diagram of a media management system, in accordance with one embodiment of the present invention.

FIG. 9 is a block diagram of a media management system 400, in accordance with one embodiment of the present invention. The media management system 400 includes a host computer 402 and a media player 404. The host computer 402 is typically a personal computer. The host computer, among other conventional components, includes a management module 406, which is a software module. The management module 406 provides for centralized management of media items (and/or playlists) not only on the host computer 402 but also on the media player 404. More particularly, the management module 406 manages those media items stored in a media store 408 associated with the host computer 402. The management module 406 also interacts with a media database 410 to store media information associated with the media items stored in the media store 408.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 402 includes a play module 412. The play module 412 is a software module that can be utilized to play certain media items stored in the media store 408. The play module 412 can also display (on a display screen) or otherwise utilize media information from the media database 410. Typically, the media information of interest corresponds to the media items to be played by the play module 412.

The host computer 402 also includes a communication module 414 that couples to a corresponding communication module 416 within the media player 404. A connection or link 418 removably couples the communication modules 414 and 416. In one embodiment, the connection or link 418 is a cable that provides a data bus, such as a FIREWIRE™ bus or USB bus, which is well known in the art. In another embodiment, the connection or link 418 is a wireless channel or connection through a wireless network. Hence, depending on implementation, the communication modules 414 and 416 may communicate in a wired or wireless manner.

The media player 404 also includes a media store 420 that stores media items within the media player 404. The media items being stored to the media store 420 are typically received over the connection or link 418 from the host computer 402. More particularly, the management module 406 sends all or certain of those media items residing on the media store 408 over the connection or link 418 to the media store 420 within the media player 404. Additionally, the corresponding media information for the media items that is also delivered to the media player 404 from the host computer 402 can be stored in a media database 422. In this regard, certain media information from the media database 410 within the host computer 402 can be sent to the media database 422 within the media player 404 over the connection or link 418. Still further, playlists identifying certain of the media items can also be sent by the management module 406 over the connection or link 418 to the media store 420 or the media database 422 within the media player 404.

Furthermore, the media player 404 includes a play module 424 that couples to the media store 420 and the media database 422. The play module 424 is a software module that can be utilized to play certain media items stored in the media store 420. The play module 424 can also display (on a display screen) or otherwise utilize media information from the media database 422. Typically, the media information of interest corresponds to the media items to be played by the play module 424.

Hence, in one embodiment, the media player 404 has limited or no capability to manage media items on the media player 404. However, the management module 406 within the host computer 402 can indirectly manage the media items residing on the media player 404. For example, to "add" a media item to the media player 404, the management module 406 serves to identify the media item to be added to the media player 404 from the media store 408 and then causes the identified media item to be delivered to the media player 404. As another example, to "delete" a media item from the media player 404, the management module 406 serves to identify the media item to be deleted from the media store 408 and then causes the identified media item to be deleted from the media player 404. As still another example, if changes (i.e., alterations) to characteristics of a media item were made at the host computer 402 using the management module 406, then such characteristics can also be carried over to the corresponding media item on the media player 404. In one implementation, the additions, deletions and/or changes occur in a batch-like process during synchronization of the media items on the media player 404 with the media items on the host computer 402.

In another embodiment, the media player 404 has limited or no capability to manage playlists on the media player 404. However, the management module 406 within the host computer 402 through management of the playlists residing on the host computer can indirectly manage the playlists residing on the media player 404. In this regard, additions, deletions or changes to playlists can be performed on the host computer 402 and then by carried over to the media player 404 when delivered thereto.

As previously noted, synchronization is a form of media management. The ability to automatically initiate synchronization was also previously discussed. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 10:
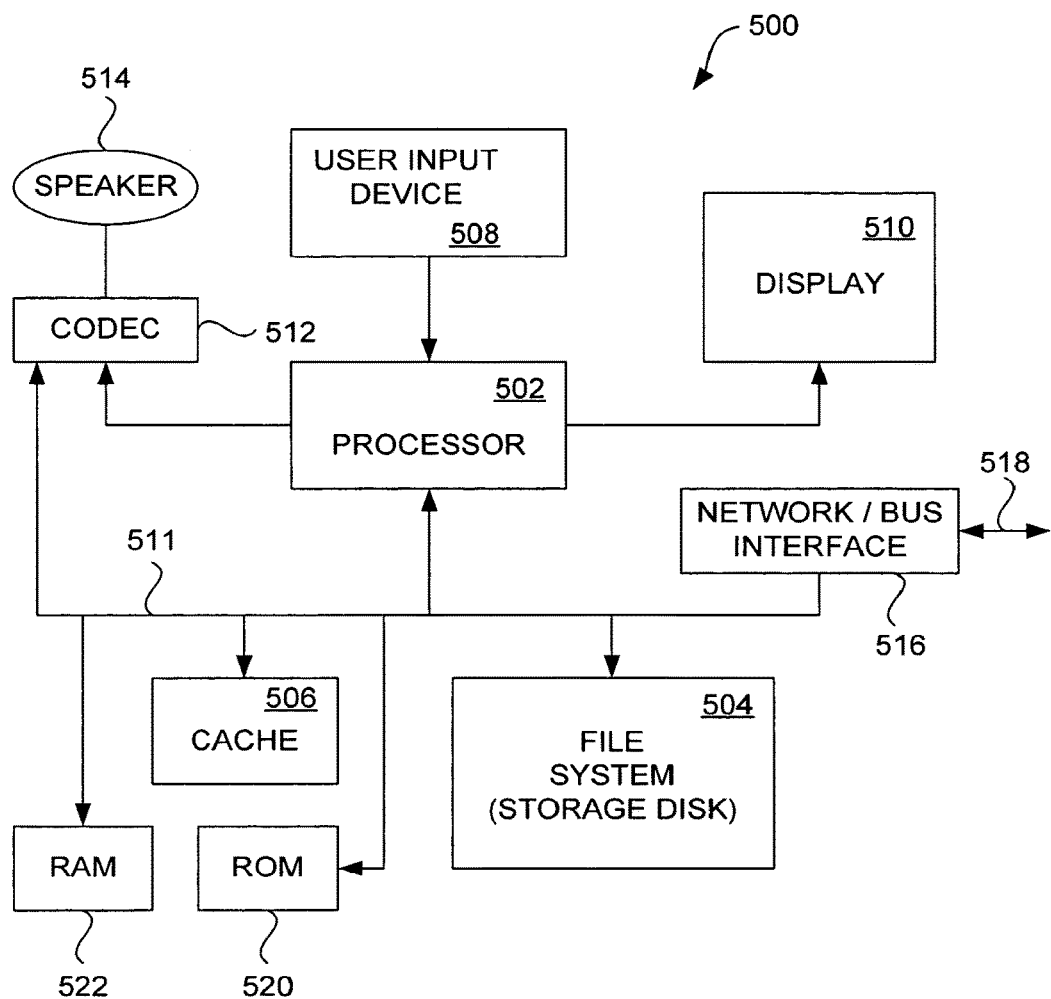
FIG. 10 is a block diagram of a media player, in accordance with one embodiment of the present invention.

FIG. 10 is a block diagram of a media player 500, in accordance with one embodiment of the present invention. The media player 500 includes a processor 502 that pertains to a microprocessor or controller for controlling the overall operation of the media player 500. The media player 500 stores media data pertaining to media items in a file system 504 and a cache 506. The file system 504 is, typically, a storage disk or a plurality of disks. The file system 504 typically provides high capacity storage capability for the media player 500. However, since the access time to the file system 504 is relatively slow, the media player 500 can also include a cache 506. The cache 506 is, for example, Random-Access Memory (RAM) provided by semiconductor memory. The relative access time to the cache 506 is substantially shorter than for the file system 504. However, the cache 506 does not have the large storage capacity of the file system 504. Further, the file system 504, when active, consumes more power than does the cache 506. The power consumption is often a concern when the media player 500 is a portable media player that is powered by a battery (not shown). The media player 500 also includes a RAM 520 and a Read-Only Memory (ROM) 522. The ROM 522 can store programs, utilities or processes to be executed in a non-volatile manner. The RAM 520 provides volatile data storage, such as for the cache 506.

The media player 500 also includes a user input device 508 that allows a user of the media player 500 to interact with the media player 500. For example, the user input device 508 can take a variety of forms, such as a button, keypad, dial, etc. Still further, the media player 500 includes a display 510 (screen display) that can be controlled by the processor 502 to display information to the user. A data bus 511 can facilitate data transfer between at least the file system 504, the cache 506, the processor 502, and the CODEC 512.

In one embodiment, the media player 500 serves to store a plurality of media items (e.g., songs) in the file system 504. When a user desires to have the media player play a particular media item, a list of available media items is displayed on the display 510. Then, using the user input device 508, a user can select one of the available media items. The processor 502, upon receiving a selection of a particular media item, supplies the media data (e.g., audio file) for the particular media item to a coder/decoder (CODEC) 1012. The CODEC 512 then produces analog output signals for a speaker 1014. The speaker 514 can be a speaker internal to the media player 500 or external to the media player 500. For example, headphones or earphones that connect to the media player 500 would be considered an external speaker.

The media player 500 also includes a network/bus interface 516 that couples to a data link 518. The data link 518 allows the media player 500 to couple to a host computer. The data link 518 can be provided over a wired connection or a wireless connection. In the case of a wireless connection, the network/bus interface 516 can include a wireless transceiver.

In another embodiment, a media player can be used with a docking station. The docking station can provide wireless communication capability (e.g., wireless transceiver) for the media player, such that the media player can communicate with a host device using the wireless communication capability when docked at the docking station. The docking station may or may not be itself portable.

The wireless network, connection or channel can be radio-frequency based, so as to not require line-of-sight arrangement between sending and receiving devices. Hence, synchronization can be achieved while a media player remains in a bag, vehicle or other container.

The host device can also be a media player. In such case, the synchronization of media items can between two media players.

Although the media items of emphasis in several of the above embodiments were audio items (e.g., audio files or songs), the media items are not limited to audio items. For example, the media item can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention. For example, the portable handheld computing device may serve as a visual indicator for a host device or other device operatively coupled thereto. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:
1. A system comprising:
  a display configured to display a graphical user interface, wherein the graphical user interface (GUI) is config- ured to display a plurality of playlists, wherein each playlist of the plurality of playlists comprises a plurality of songs;
an input device configured to receive a user selection of a playlist from the plurality of playlists via the GUI;
a light source configured to provide backlighting to the display; and
a processor configured to control a light level transmitted by the light source according to a playlist, which is selected from the plurality of playlists, wherein the processor is configured to control the light level using a preset intensity pattern assigned to the selected playlist.

2. The system of claim 1, wherein the processor is configured to alternate the light source between light modes of a plurality of light modes according to the playlist, which is selected from the plurality of playlists, and wherein at least one of the playlists of the plurality of playlists corresponds to a light beacon effect associated with at least one of the light modes of the plurality of light modes.

3. The system of claim 1, wherein the display is configured to present text or graphics, the backlighting being configured to provide a visual stimulus for relaying information about the selected playlist to an area around the system.

4. The system of claim 1, wherein the light source is configured to operate in a first light mode providing constant luminance to the display and a second light mode that provides varying luminance for relaying information to a user or the user's surroundings, wherein an alternation between the first and second light modes occurs upon selection of standard or enhanced lighting.

5. The system of claim 2, wherein the light beacon effect is configured to alert others of the user's presence.

6. A portable communication device, comprising:
a display configured to display at least a graphical user interface (GUI), wherein the GUI is configured to display a plurality of playlists, wherein each playlist of the plurality of playlists comprises a plurality of songs;
a light source configured to provide a backlight to the display, the backlight providing luminance for the GUI;
an input device configured to receive a user selection of a playlist from the plurality of playlists; and
a processor configured to alternate the light source between light modes of a plurality of light modes in response to the user selection of a playlist, which is selected from the plurality of playlists, wherein the processor is configured to flash the light source using a preset intensity pattern assigned to the selected playlist.

7. The portable communication device of claim 6, wherein the playlist is configured to be created on a remote computing device separate from and remote to the portable communication device.

8. The portable communication device of claim 7, comprising a wireless communication module configured to wirelessly couple the remote computing device to the portable communication device.

9. The portable communication device of claim 7, wherein the remote computing device comprises a personal computer, a cellular telephone, a portable media player, or any combination thereof.

10. The portable communication device of claim 6, wherein the portable communication device comprises a portable media player, a cellular phone, or any combination thereof.

11. A method for controlling a light source in a backlit display, comprising:
displaying a plurality of playlists in a graphical user interface (GUI), wherein the GUI is displayed on a display having a light source to backlight the display, wherein each playlist comprises a respective plurality of songs;
receiving a selection of a playlist via an input device configured to receive a user selection of a playlist from the plurality of playlists using the graphical user interface, wherein the playlist comprises one or more media files; and
alternating the light source between a plurality of light modes based at least in part upon the selected playlist selected from the plurality of playlists, wherein at least one of the light modes of the plurality of light modes causes the light source to flash using a preset intensity pattern assigned to the selected playlist.

12. The method of claim 11, wherein displaying the plurality of playlists comprises backlighting the display using a standard mode until a selection is received.

13. The method of claim 11, wherein alternating the light source between a plurality of light modes is based in part upon a detection of motion via an accelerometer.

14. The method of claim 11, wherein alternating the light source between a plurality of light modes comprises flashing the light source.

15. A system comprising:
a display;
an input device configured to receive a user selection of a playlist from a plurality of playlists, wherein each playlist of the plurality of playlists includes a plurality of songs;
a light source configured to provide backlighting to the display; and
a processor configured to control a light level transmitted by the light source according to a playlist, which is selected from the plurality of playlists, wherein the processor is configured to control the light level using a preset intensity pattern assigned to the selected playlist.

16. The system of claim 15, wherein the playlist is configured to be created on a remote computing device separate from and remote to a portable communication device that comprises the display.

17. The system of claim 16, comprising a wireless communication module configured to wirelessly couple the remote computing device to the portable communication device.

18. The system of claim 16, wherein the remote computing device comprises a personal computer, a cellular telephone, a portable media player, or any combination thereof.

19. The system of claim 15, wherein the portable communication device comprises a portable media player, a cellular phone, or any combination thereof.

20. The system of claim 15, wherein at least one of the playlists of the plurality of playlists corresponds to a light beacon effect that causes the processor to flash the light source.

* * * * *